US007971691B2

(12) United States Patent
Holzapfel

(10) Patent No.: US 7,971,691 B2
(45) Date of Patent: Jul. 5, 2011

(54) DAMPER FOR MOVABLE FURNITURE PARTS

(75) Inventor: Andreas Holzapfel, Bregenz (AT)

(73) Assignee: Julius Blum GmbH, Hochst (AT)

( * ) Notice: Subject to any disclaimer, the term of this patent is extended or adjusted under 35 U.S.C. 154(b) by 1350 days.

(21) Appl. No.: 11/374,098

(22) Filed: Mar. 14, 2006

(65) Prior Publication Data

US 2006/0220284 A1 Oct. 5, 2006

(30) Foreign Application Priority Data

Apr. 1, 2005 (AT) .................................. A 554/2005

(51) Int. Cl.
*F16F 9/00* (2006.01)

(52) U.S. Cl. ................................ 188/321.11; 267/64.12

(58) Field of Classification Search .. 188/319.1–322.22; 267/221–226
See application file for complete search history.

(56) References Cited

U.S. PATENT DOCUMENTS 2,000,132 A * 5/1935 Gray ............................ 188/275
3,843,107 A * 10/1974 Atkins ....................... 267/64.15
5,116,016 A * 5/1992 Nagata .......................... 248/578
5,522,483 A * 6/1996 Koch ......................... 188/282.2
5,553,836 A * 9/1996 Ericson ......................... 267/286
6,155,545 A * 12/2000 Noro et al. .................... 267/221
6,443,272 B1 * 9/2002 Rottenberger et al. .... 188/319.2
6,902,045 B2 * 6/2005 Oliver et al. ............. 188/321.11
2002/0189913 A1 * 12/2002 Lemieux ....................... 188/275

FOREIGN PATENT DOCUMENTS

AT 005 429 U1 6/2001
DE 3729 597 A1 3/1989
DE 199 31 362 A1 2/2001
DE 201 11 455 U1 12/2001
DE 10 2006 007 702 8/2007
EP 1 375 797 A1 1/2004
JP 55-6315 6/1978
JP 4-39134 4/1992
JP 7-233839 9/1995
WO 03/081077 A1 10/2003

OTHER PUBLICATIONS

European Search Report issued on Nov. 19, 2008 in European Application No. 08 01 8790.

* cited by examiner

*Primary Examiner* — Christopher P Schwartz
(74) *Attorney, Agent, or Firm* — Wenderoth, Lind & Ponack, L.L.P.

(57) ABSTRACT

A danger for movable furniture parts includes a housing and a cylinder disposed in the housing, in which a piston with a piston rod is movably supported. At least one set of gears is supported movably on the housing, by which the cylinder and/or a stop for the piston rod can be adjusted relative to the housing.

32 Claims, 8 Drawing Sheets

DAMPER FOR MOVABLE FURNITURE PARTS

BACKGROUND OF THE INVENTION (1) Field of the Invention

The present invention relates to a damper for movable furniture parts, having a housing and a cylinder disposed therein, in which a piston with a piston rod is movably supported.

(2) Description of Related Art

Dampers of this type are known in the art and serve to substantially reduce the banging noises and mechanical stresses which occur when movable furniture parts, such as doors or drawers, are forcefully closed. Known dampers are matched to average values, i.e. to average weights of doors or drawers. In order to adapt already-fitted dampers optimally to the furniture or to the movable furniture parts to be damped, individual adjustment is desirable.

BRIEF SUMMARY OF THE INVENTION

It is an object of the present invention to provide a damper of the aforementioned type which is characterised by the greatest possible flexibility and applicability.

This is achieved according to the invention in an advantageous embodiment in which at least one set of gears (i.e. a transmission) is arranged on the housing, by which at least one of the cylinder and a stop for the piston rod can be adjusted relative to the housing.

The damper can be adjusted ideally to doors, flaps or drawers by the proposed gears, since the cylinder is adjustable with respect to the housing, so that the impact point of the movable furniture part can be precisely set. Secondly, this also means that the characteristic line or damping characteristics of the damper can be purposefully influenced, since an adjustment according to the different weights of the movable furniture parts and according to the varying forces of hinges or retraction devices can occur.

In connection with the present invention, the word "gears" should be understood as a device for coupling or for conversion of movements of any kind. The motion passing into the gears can be rotary or pushing and can be diverted with identical, different, uniform or non-uniform motion ratios.

One embodiment of the invention makes provision for the gears to include at least two movably supported parts. In this connection, provision can be made that one part of an actuation element and a further part is formed by the stop of the piston rod. It can thereby be advantageous if the gears convert a rotary movement of the actuation element into a linear movement of the cylinder and/or of the stop.

One preferred embodiment of the invention makes provision that the gears have at least one worm drive. In this case the design can be such that the worm has at least one tooth or at least one, preferably spiral-shaped, flight. There can also be provision made that the worm is multiple-threaded in design. In this connection, provision may advantageously be made that the stop is formed by the worm.

One preferred embodiment of the invention makes provision that the set of gears is designed as a self-locking worm gear. In order to move the worm in the axial direction of the housing, it may be advantageous if the gears have at least one worm wheel. In this case the design can be such that the actuation element is formed by the worm wheel. The worm gear can be realised with various transmission ratios. The embodiment with a worm gear has the advantage that in addition to an exact adjustment option, adjustment with little or no play is also provided.

One preferred embodiment of the invention makes provision that the stop is cup-shaped. This gives the piston rod resting and/or anchored in the cup-shaped stop a stable, non-slip seat. It can thereby be advantageous if the stop has a recess which is provided as a seat for the piston rod, preferably for the free end thereof.

One embodiment of the invention makes provision that the stop has at least one, preferably annular, limiting element, which in a final position, preferably in the inner final position of the stop relative to the housing, co-operates with a counter stop disposed on or built onto the housing, and can be disengaged in a further position of the counter stop. This prevents the stop being moved too far out of the housing and possibly no longer engaging with the gears.

Advantageously, provision is made that the cylinder is designed in two parts, wherein the inner cylinder accepting the piston is encircled by an outer pushed-on sleeve. The sleeve can in this case be designed as a pusher which offers the movable furniture part a larger and therefore more secure contact area than the cylinder itself. In order to influence the impact point of the movable furniture part on the damper, it can be advantageous that an adjustment device in the form of a screw is disposed on the front face of the inner cylinder or of the sleeve, and said screw is movably supported in the axial direction of the housing.

One possible embodiment of the invention makes provision that a first projection is disposed or formed on the inner cylinder or on the sleeve, and said projection, in one position, co-operates with a second projection disposed or formed on the housing in a position, preferably in the outer final position of the cylinder and/or of the sleeve relative to the housing, and in a further position can be disengaged from the second projection. This not only makes it possible to prevent the cylinder moving too far out of the housing, but also means the cylinder can be supported in the outer final position, so that when the gear is actuated any further axial displacement of the cylinder is prevented, and that thereby the position of the piston and of the piston rod respectively can be varied relative to the cylinder. By movement of the piston and piston rod respectively relative to the housing, the characteristic line or damping characteristics can be influenced such that an individual adjustment of the damping path can be defined.

The damper itself can be designed in the usual way as a fluid damper which can be filled with a working fluid, for example oil or air. It can then be advantageous for an energy-storing device, preferably a spring, to be disposed in the cylinder in addition to the fluid damping.

One possible embodiment of the invention in which the damper has a housing and a cylinder disposed therein, wherein a piston with a piston rod is movably supported in the cylinder, makes provision that at least one adjustment device is supported on the housing, by which a stop for the piston rod is movable relative to the housing.

One further possible variant of the invention, in which the damper has a housing and a cylinder disposed therein, where a piston with a piston rod is movably supported in the cylinder, makes provision that a first adjustment device is provided to adjust the cylinder relative to the housing, and a separate second adjustment device is disposed to adjust a stop for the piston rod. It can thereby be advantageous if the first adjustment device is preferably formed from a worm gear, as the result of which the position of the cylinder relative to the housing can be, altered. Provision is advantageously made, if the second adjustment device is formed by a screw, by which the position of the piston rod relative to the cylinder can be altered. In this connection, provision can be made that the screw preferably rests on a front face of the housing or of the stop and that the screw can be actuated from outside the housing.

Finally, one embodiment of the invention makes provision that the housing has at least one, preferably two, mounting flange(s) which can be fastened to an item of furniture and/or a movable part thereof for fixing purposes.

Further details and advantages of the prevent invention will next be explained in more detail with reference to the drawings, which show:

DETAILED DESCRIPTION OF THE INVENTION

Figures 1A, 1B:
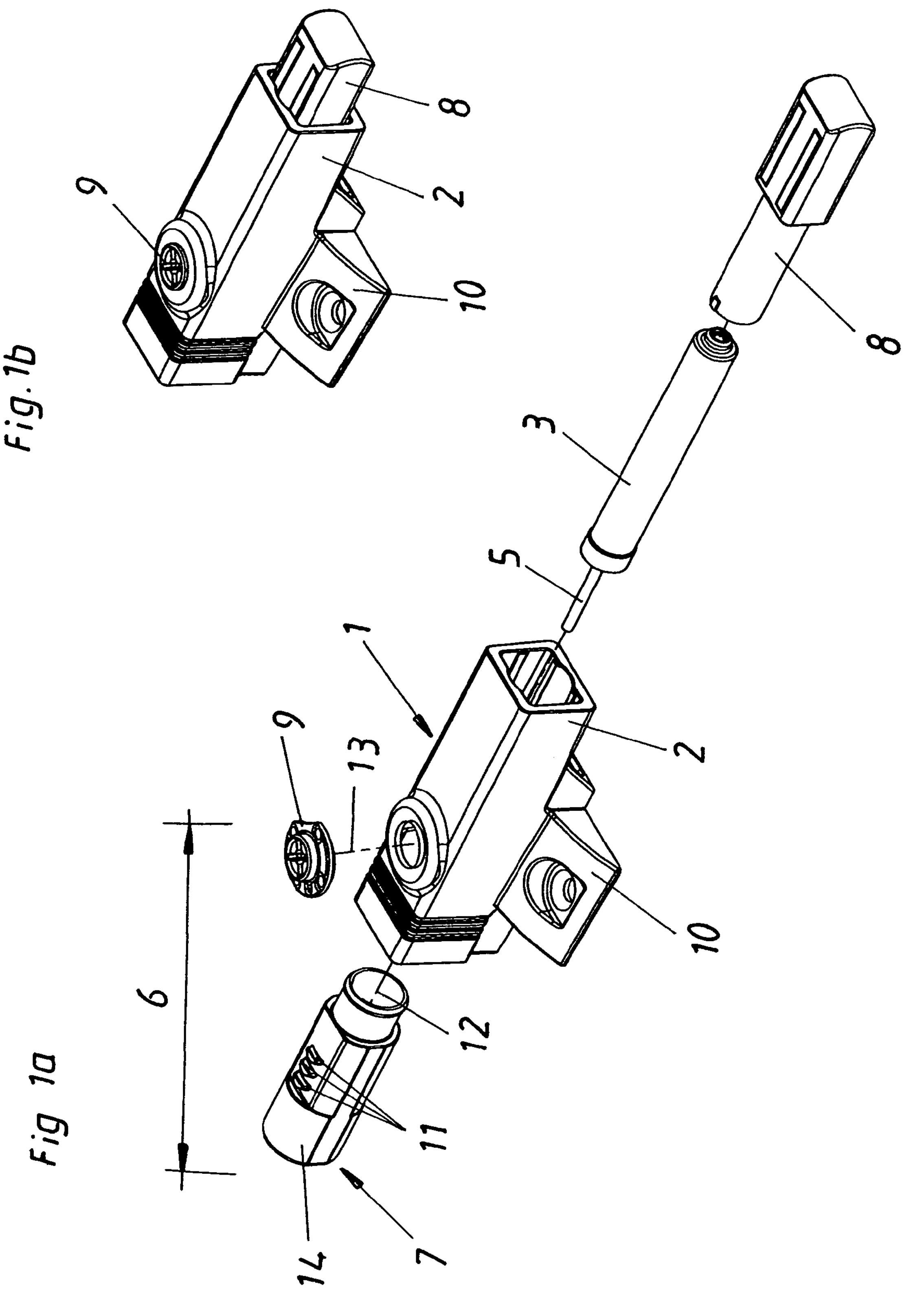
FIG. 1*a*, 1*b* show an exploded view and a perspectival view of the damper in assembled condition.

FIG. 1*a* shows an exploded view of the damper 1, and FIG. 1*b* shows the damper 1 in assembled condition. The damper 1 comprises a housing 2, in which a cylinder 3 with the piston rod 5 is movably supported. A set of gears 6, which in the embodiment shown is designed as a worm gear, is provided to move the cylinder 3. The set of gears 6 comprises a stop 7 formed by the worm 14, and said stop is movable in the axial direction of the housing 2. For axial displacement of the worm 14, the actuation element 9 is provided in the form of a worm wheel, which can preferably be actuated by a screwdriver. The actuation element 9—with respect to the longitudinal axis of the cylinder 3—is laterally supported movably, preferably rotatably, on the housing 2. Advantageously, provision is made that the axis of rotation of the actuation element 9 runs crosswise, preferably essentially at an angle of 90°, to the longitudinal axis of the cylinder 3. This allows the actuation element 9 to be externally accessible from its mantle area, when the housing 2 has a circular, oval or polygonal cross-section, which enables easy access to the actuation element 9 when a damper 1 is already mounted in or on an item of furniture. It can thereby be advantageous if the angle between the axis 12 of the worm 14 and the axis 13 of the worm wheel 9 is preferably more or less 90°. The worm 14 has teeth 11 on its upper side which can be engaged with the worm wheel 9. A rotary movement of the worm wheel 9 is converted into a linear movement of the worm 14. The piston rod 5 thereby always abuts on the closed base of the cup-shaped worm 14, so that if there is any displacement of the worm 14, there is also a displacement of the cylinder 3 relative to the housing 2. A sleeve 8 can be pushed onto the side of the cylinder 3 facing away from the piston, said sleeve coming into contact with the furniture part to be damped during the damping procedure.

FIG. 1*b* shows the assembled damper 1, wherein by rotation of the worm wheel 9, a displacement of the cylinder 3 together with sleeve 8 pushed thereon relative to the housing 2 occurs.

Figure 2B:
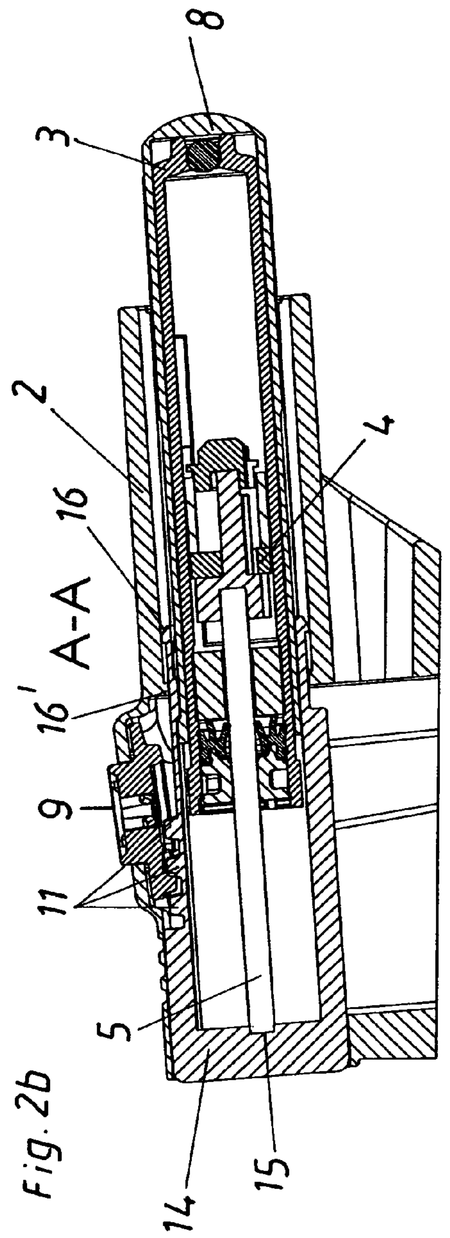
FIG. 2*a*, 2*b* show a top view of the damper and a vertical section along the axis A-A.
Figure 2A:
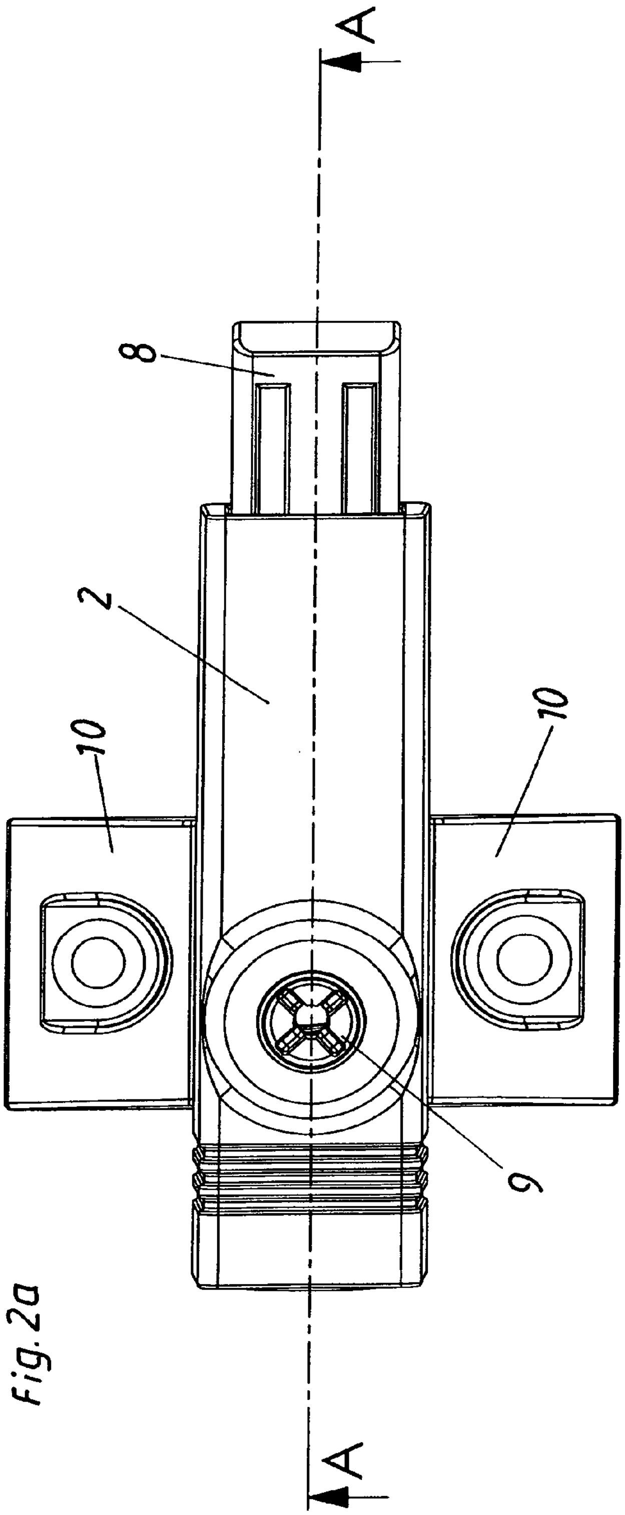

FIG. 2*a* shows a top view of the damper 1. By rotating the worm wheel 9, the cylinder 3, not visible, together with the sleeve 8, can be adjusted relative to the housing 2. Mounting flanges 10 are provided on both sides of the housing 2 for fastening onto a piece of furniture or movable furniture part. FIG. 2*b* shows a vertical section along the axis A-A from FIG. 2*a*. The housing 2, in which the worm 14 is adjustably supported, can be seen. The worm wheel 9 engages with its toothing in the teeth 11 of the worm 14, so that if there is any rotation of the worm wheel 9, an axial displacement of the worm 14 relative to the housing 2 occurs. The free end of the piston rod 5 is supported in a recess 15 of the worm 14, while the piston rod 5 permanently rests on the base of the cup-shaped worm 14. Thus in any axial displacement of the worm 14, the whole cylinder 3 is displaced. A piston 4 is formed on the piston rod 5, said piston 4 being guided within the cylinder 3. A sleeve 8, which impacts on the item of furniture to be damped, is pushed onto the cylinder 3. To limit axial displacability in the internal end position of the worm relative to the housing, a limiting element 16, which is preferably annular, is provided, which co-operates with a counter stop 16' disposed on the housing 2 in the inner end position of the worm 14. In this embodiment, there is no provision for any change of the characteristic line or damping characteristics.

Figures 3A, 3B, 3C:
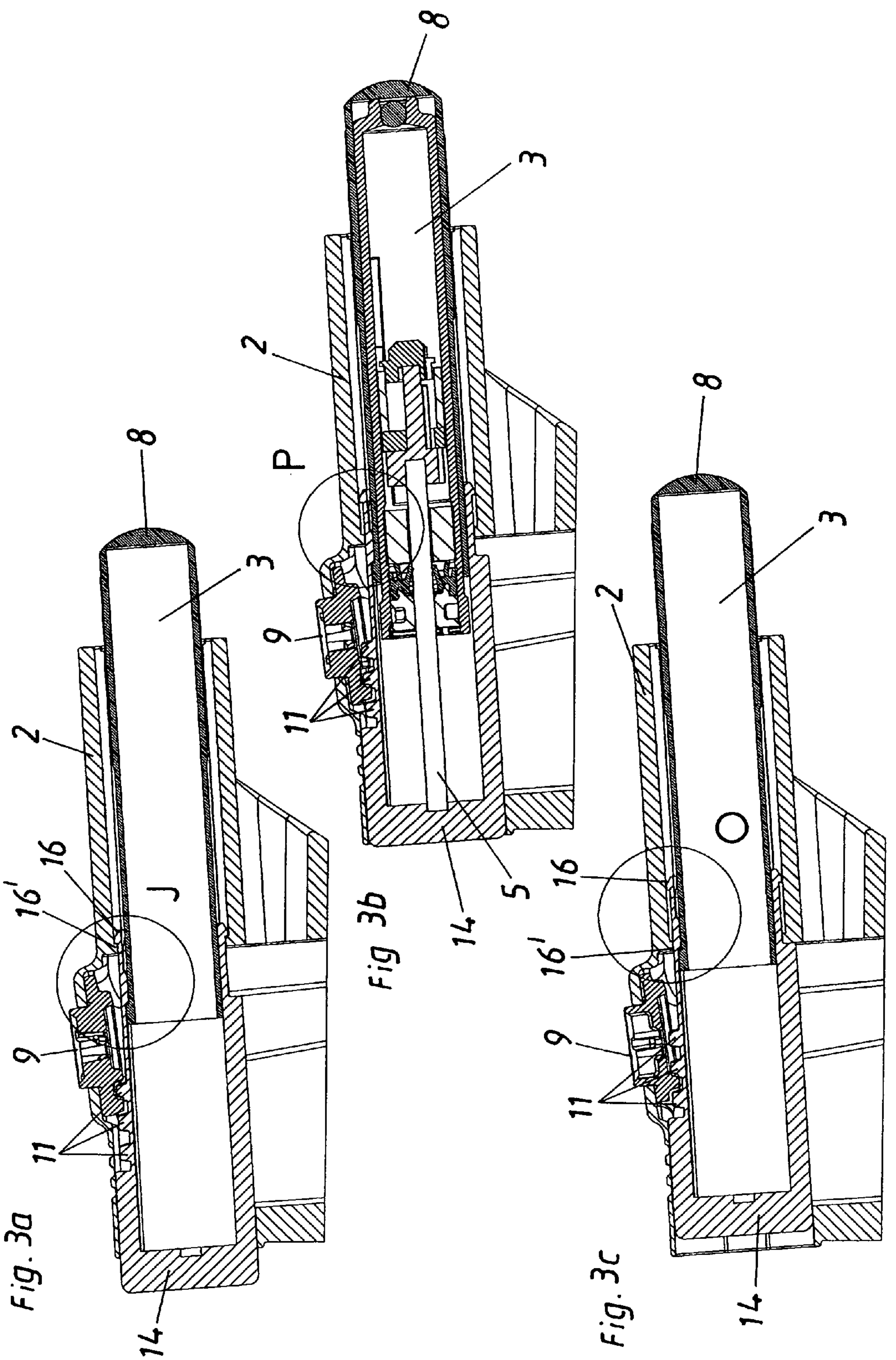
FIG. 3*a*-3*c* show various vertical sections of the damper with different positions of the worm.

FIGS. 3*a*-3*c* show various settings of the cylinder 3 in relation to the housing 2. FIG. 3*a* shows the worm 14 in the rearmost position relative to the housing 2. In this position the limiting element 16 and the counter stop 16' of the housing 2 abut on each other. By rotating the worm wheel 9, the worm 14 is gradually displaced to the right. FIG. 3*b* shows a central position of the worm 14 and of the cylinder 3 respectively in relation to the housing 2, while FIG. 3*c* shows the outer end position of the worm 14 and of the cylinder 3 relative to the housing 2. In this position, the limiting element 16 and the counter stop 16' are at a distance from each other.

Figure 4A:
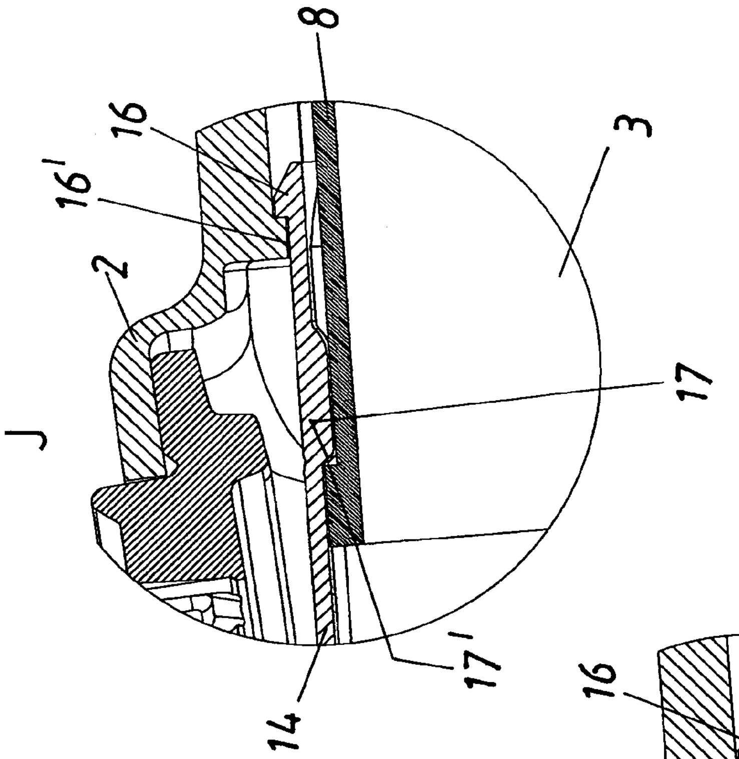
FIG. 4*a*-4*c* show enlarged detail view from FIG. 3*a*-3*c,*
Figure 4B:
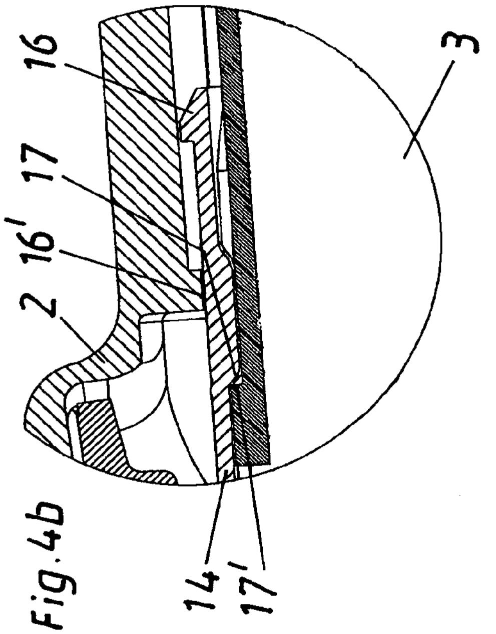
Figure 4C:
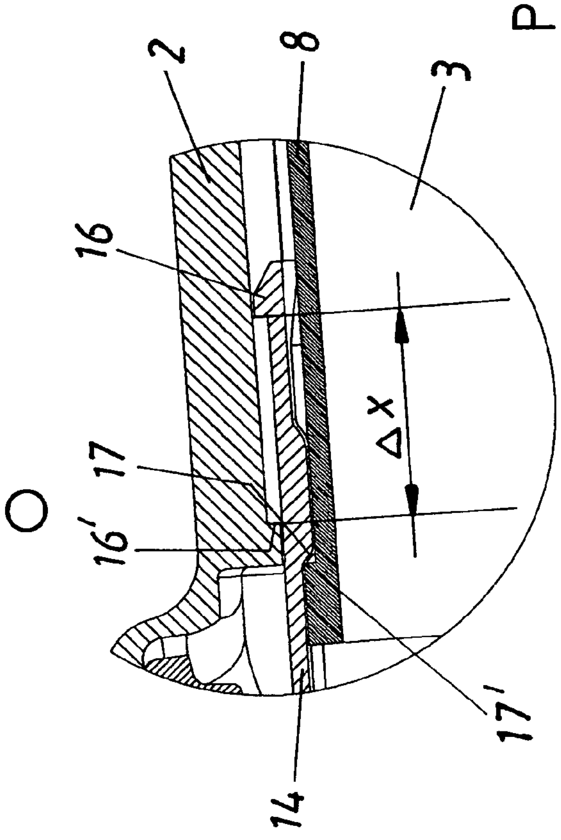

FIGS. 4*a*-4*c* show the enlarged detail views J, P and 0 from FIGS. 3*a*-3*c*. FIG. 4*a* shows the worm 14 and the cylinder 3 respectively in the inner end position relative to the housing 2, in which the limiting element 16 abuts on the counter stop 16'. The sleeve 8 has a locking projection 17 which permanently abuts on a locking projection 17' disposed on the worm 14. FIG. 4*b* shows the central position of the worm 14 and of the cylinder 3 respectively where the limiting element 16 is at a distance from the counter stop 16'. FIG. 4*c* shows the maximum adjustment of the worm 14 and of the cylinder 3 respectively, by the difference in dimensions A.

Figures 5A, 5B, 5C, 5D:
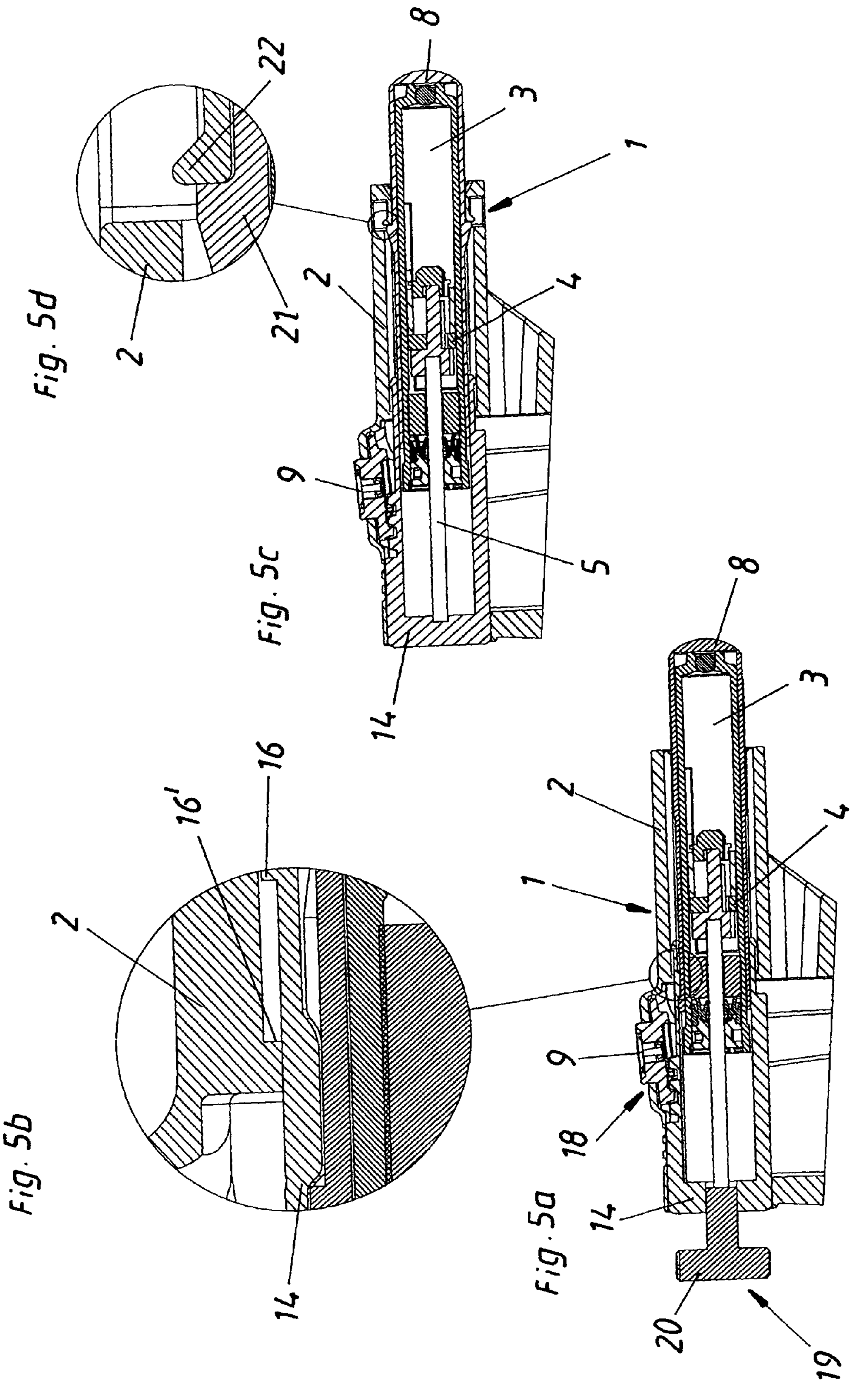
FIG. 5*a*-5*d* show two different embodiments with enlarged detail views, where the characteristic line of the damper is adjustable.

FIG. 5*a* shows a further embodiment of the invention with two separate adjustment devices 18 and 19. The first adjustment device 18 comprises the worm gear already described, with the worm 14 and the worm wheel 9. The first adjustment device 18 is provided for adjustment of the cylinder 3 relative to the housing 2. In addition to the first adjustment device 18, a second adjustment device 19 is provided, by which the piston rod 5 can be adjusted relative to the cylinder 3. This influences the characteristic line of the damper 1 or its damping characteristics. The second adjustment device 19 has a screw 20, which rests on the front face of the worm 14, while the worm 14 serves as stop 7 for the piston rod 5. The first adjustment device 18 blocks any axial movement of the worm 14, and therefore when the screw 20 is actuated the piston rod 5 and the piston 4 are displaced relative to the cylinder 4. By rotating the screw 20 clockwise, the piston 4 is pushed further into the cylinder 3, so that a shorter damping path remains until the piston 4 is completely pushed into the cylinder 3.

When the screw 20 is rotated counter clockwise the piston 4 and the piston rod 5 are moved further out of the cylinder 3, so that a longer damping path of the piston 4 to the completely pushed-in position thereof ensues. FIG. 5*b* shows an enlarged view of the detail from FIG. 5*a*. The worm 14 has been displaced with the aid of the first adjustment device 18 so far into the interior of the housing 2 that the limiting element 16 of the worm 14 and the counter stop 16' of the housing 2 are at a distance from each other. The axial position of the worm 14 remains fixed, and the damping characteristics of the damper 1 can be adjusted by actuating the second adjustment device 19.

FIG. 5*c* and the enlarged detail view in FIG. 5*d* show an alternative embodiment to the damper 1 shown in FIG. 5*a* and FIG. 5*b* respectively, whereby the damping characteristics and the characteristic line respectively of the damper 1 can be adjusted by the worm wheel 9. In order to prevent any further axial displacement of the cylinder 3, a first projection 21 is disposed or formed on the (inner) cylinder 3 or on the sleeve 8 thereof, which preferably co-operates in the outer end position of the cylinder 3 or the sleeve 8 thereof relative to the housing 2 so that any further axial displacement of the cylinder 3 to the housing 2 is prevented. The piston rod 5 thereby again rests on the cup-shaped worm 14, while the worm 14 is movable by the worm wheel 9 in the axial direction of the housing 2. Since any further axial displacement is prevented by the co-operating projections 21, 22, when the worm wheel 9 is actuated the piston rod 5 and the piston 4 respectively can be pushed into the cylinder 3 to a greater or lesser distance. Depending on the position of the piston rod 5 and of the piston rod 4 in relation to the cylinder 3, the damping characteristics of the damper 1 can be different by design.

Figure 6A:
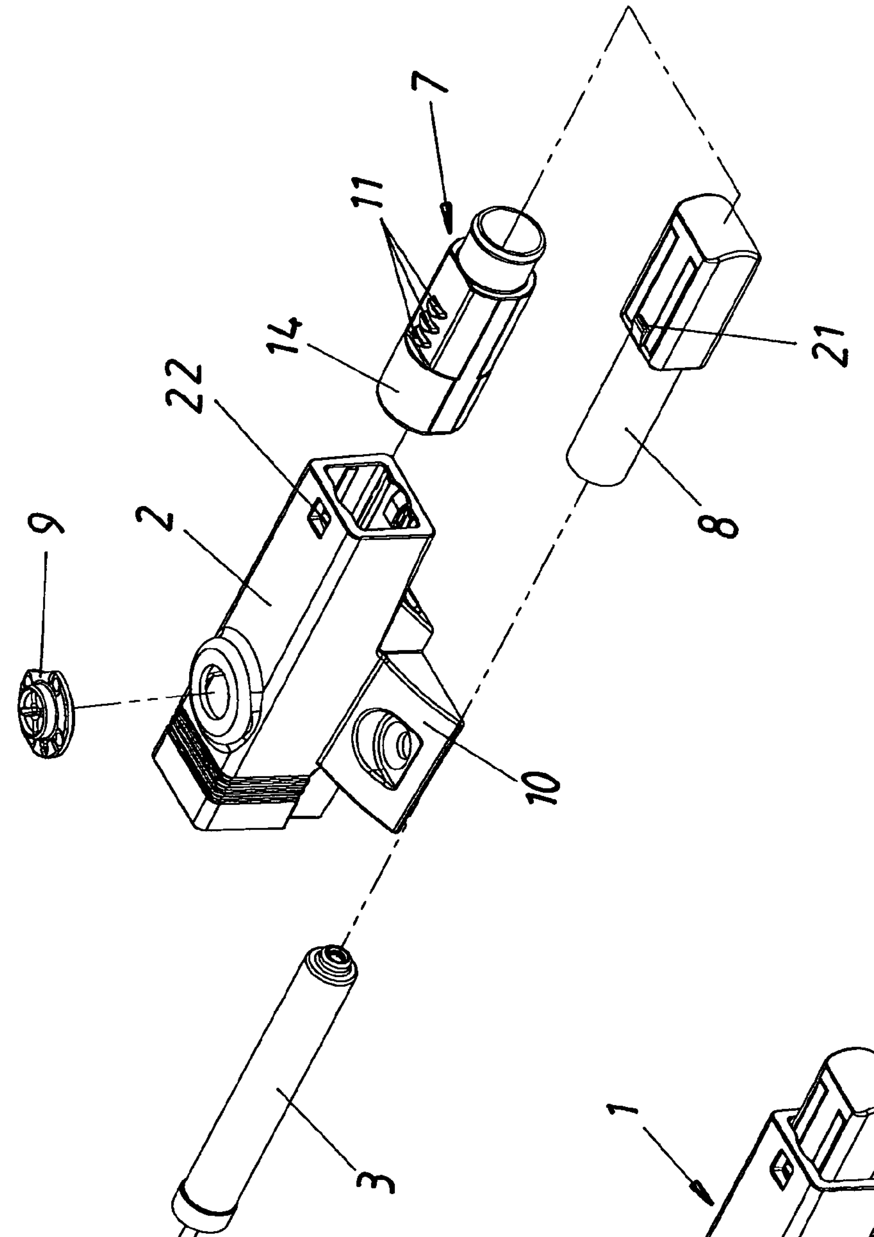
FIG. 6*a*, 6*b* show an exploded view of the embodiment from FIG. 5*c*, 5*d* and the damper in assembled condition.
Figure 6B:
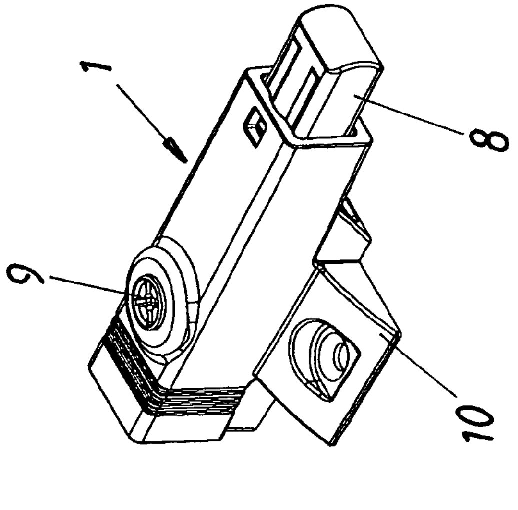

FIG. 6*a* shows an exploded view of the embodiment from FIG. 5*c* and FIG. 5*d* respectively in which the characteristic line of the damper 1 can be varied by adjustment of the worm wheel 9. The housing 2 has a projection 22 which co-operates with a projection 21 of the sleeve 8, in order to prevent any further outward movement of the cylinder 3 in relation to the housing 2. The stop 7 is formed by the cup-shaped worm 14, the teeth of which can be engaged with the worm wheel 9. FIG. 6*b* shows the damper 1 in assembled condition.

Figures 7A, 7B, 7C:
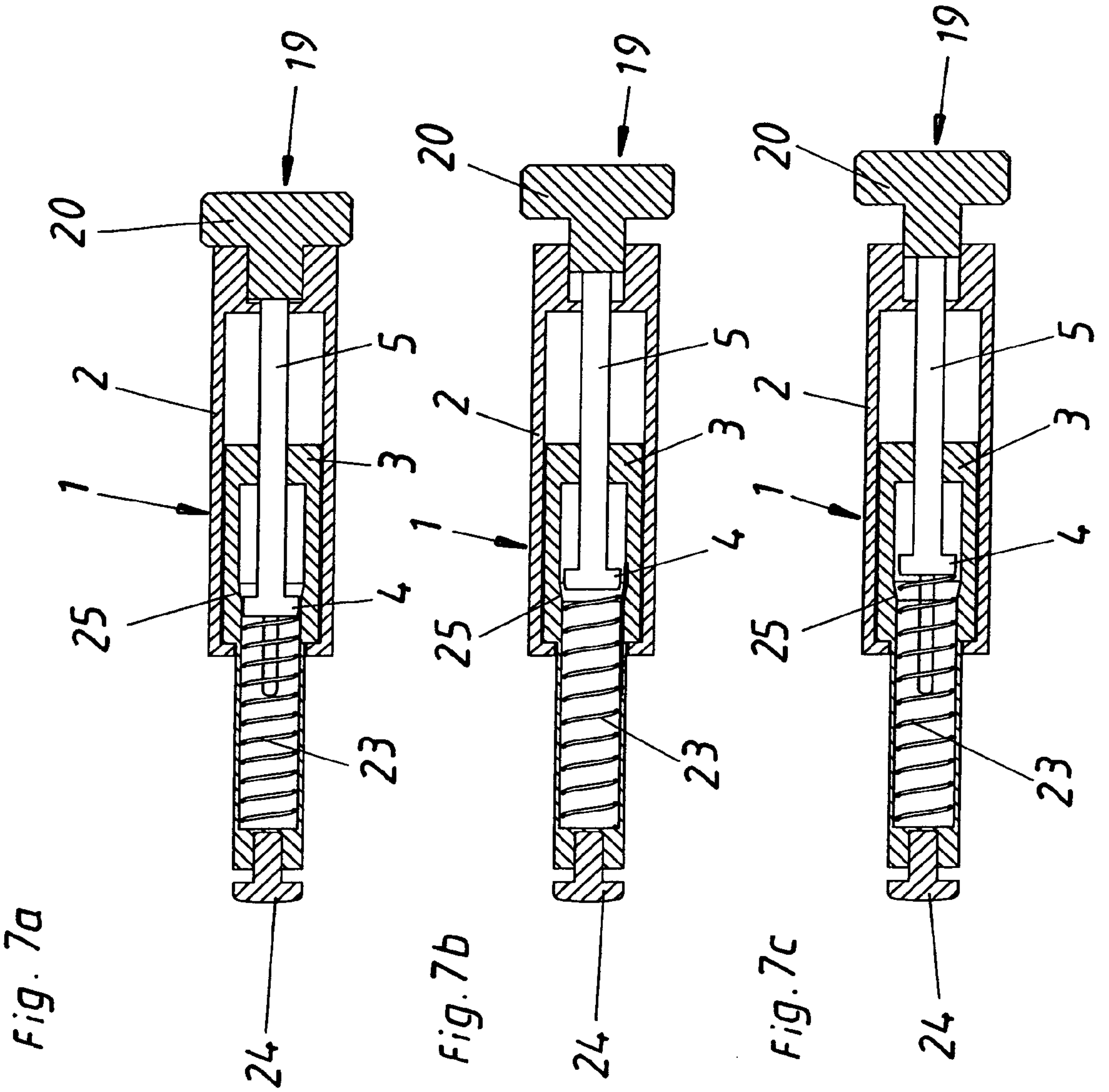
FIG. 7*a*-7*c* show a further embodiment of the characteristic line adjustment of the damper and FIG. 8*a*-8*c* show the embodiment from FIG. 7*a*-7*c* with different positions of the adjustment wheel for adjusting the impact point of the damper.

FIGS. 7*a*-7*c* show a further embodiment of the invention. The housing 2 has an adjustment device 19 on its front face, which in the embodiment shown comprises a knurled screw 20 which is adjustable in the axial direction of the housing 2, which is accessible and/or actuatable from outside the housing 2. The knurled screw 20 thus forms a displaceable stop for the piston rod 5, on which a piston 4 is formed. The cylinder 3 has a taper 25 so that when the knurled screw 20 is screwed out, the piston 4 is also moved to the right and an annular gap formed between piston 4 and cylinder wall also becomes larger. When the cylinder 3 is pushed in relative to the piston 4 against the force of the spring 23, a different degree of damping occurs, depending on the position of the piston 4. An adjustment wheel 24 is supported on the front face of the cylinder 3, said wheel being adjustable in the axial direction of the cylinder 3. The cylinder 3 can thereby be virtually lengthened, so that when the damper 1 is already mounted, the impact point of a furniture part to be damped can also be exactly defined.

Figures 8A, 8B, 8C:
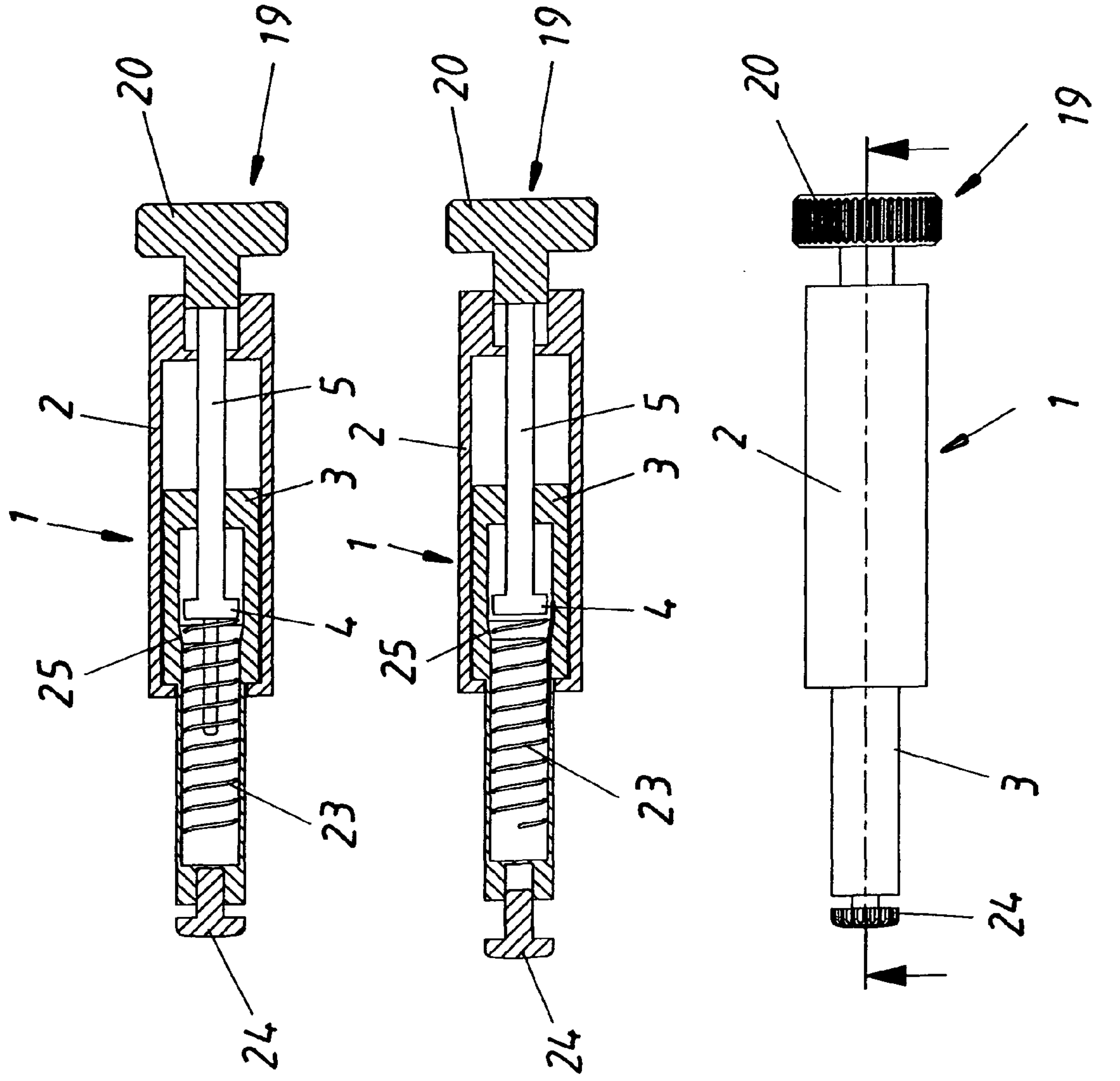

FIGS. 8*a*-8*c* show the embodiment from FIG. 7*a*-7*c*, where FIGS. 8*a* and 8*b* show a different position of the adjustment wheel 24. The characteristic line of the damper 1 is not influenced by the adjustment of the adjustment wheel 24. Any change of the damping characteristics occurs by means of the knurled screw 20. FIG. 8*c* shows a diagrammatic top view of the damper 1.

The present invention is not limited to the embodiments shown, but comprises or extends to all variants and technical equivalents which may fall within the scope of the following claims. The references to positions, such as e.g. above, below, lateral, etc., used in the specification relate to the respective assembly position and/or to the figure just described and shown and should, if there is any change in position, be transferred accordingly to the new position. The cylinder itself can have changes in diameter, grooves, or else, combinations of the two.

The invention claimed is:

1. A damping device for movable furniture parts, the damping device comprising:
- a housing;
- a cylinder arranged in the housing;
- a piston which is movable within the housing;
- a piston rod connected to and movable with the piston;
- a stop abutting against the piston rod; and
- a transmission for adjusting the stop, the transmission including an adjustable actuating element,
- wherein the transmission converts a rotational movement of the actuating element into a linear movement of the piston rod, and
- wherein the actuating element is arranged on a side of the housing and is movable with respect to the housing.

2. The damping device according to claim 1, wherein the transmission is a set of gears, and the actuating element can be adjusted by a screwdriver to move the piston rod.

3. The damping device according to claim 2, wherein the actuating element is rotatably mounted on the housing.

4. The damping device according to claim 3, wherein an axis of rotation of the actuating element runs crosswise to a longitudinal axis of the cylinder.

5. The damping device according to claim 1, wherein the transmission is a set of gears, and the set of gears has at least one worm.

6. The damping device according to claim 5, wherein the worm has at least one tooth or at least one thread.

7. The damping device according to claim 5, wherein the worm has at least one thread, and the thread is spiral-shaped.

8. The damping device according to claim 5, wherein the worm has multiple threads.

9. The damping device according to claim 5, wherein the stop is formed by the worm.

10. The damping device according to claim 1, wherein the transmission converts a rotational movement of the actuating element into a linear movement of the cylinder relative to the housing.

11. The damping device according to claim 10, wherein the transmission includes a worm gear, and wherein the actuator element is formed by the worm gear.

12. The damping device according to claim 10, wherein the transmission includes a worm and a worm gear, and wherein the angle between the axis of the worm and the axis of the worm gear is essentially 90°.

13. The damping device according to claim 1, wherein the housing includes a counter stop,
- wherein the stop has at least one limiting element which engages the counter stop.

14. The damping device according to claim 13, wherein the limiting element is annular-shaped.

15. The damping device according to claim 1, wherein the stop has a recess which accepts the piston rod.

16. The damping device according to claim 5, wherein the recess is provided to accept a free end of the piston rod.

17. The damping device according to claim 1, wherein the cylinder includes an inner cylinder and a pushed-on sleeve which encircles the inner cylinder, the inner cylinder accepting the piston.

18. The damping device according to claim 17, wherein a first projection is disposed on the inner cylinder or on the sleeve, said first projection co-operating with a second projection disposed on the housing in a final position of at least one of the inner cylinder and the sleeve, and wherein the first projection can be disengaged from the second projection by advancing at least one of the inner cylinder and the sleeve to a further position.

19. The damping device according to claim 1, wherein the cylinder can be filled with a fluid.

20. The damping device according to claim 19, wherein the cylinder can be filled with oil or air.

21. The damping device according to claim 1, wherein an energy-storing device is disposed in the cylinder.

22. The damping device according to claim 21, wherein the energy-storing device comprises a spring.

23. The damping device according to claim 1, wherein the transmission is a set of gears including at least two movable parts.

24. The damping device according to claim 1, wherein an axis of rotation of the actuating element is substantially parallel to a longitudinal axis of the cylinder.

25. The damping device according to claim 1, wherein the stop is cup-shaped.

26. The damping device according to claim 1, wherein the housing has at least one mounting flange for fastening the housing to an item of furniture.

27. The damping device according to claim 1, wherein the transmission includes a worm disposed in the housing and movable with respect to the housing, wherein the actuating element adjusts a position of the worm relative to the housing, and wherein the stop is formed in the worm such that adjusting the position of the worm adjusts a position of the piston rod.

28. A damping device for movable furniture parts, the damping device comprising:

a housing;

a cylinder arranged in the housing;

a piston which is movable within the cylinder;

a piston rod connected to and movable with the piston;

a stop which is movable relative to the housing in a longitudinal direction of the piston rod;

an adjustment device arranged on the housing for moving the stop in the longitudinal direction of the piston rod, wherein the piston rod abuts onto the stop such that movement of the stop with the adjusting device adjusts a position of the piston rod relative to the housing.

29. The damping device according to claim 28, wherein the adjustment device is a first adjustment device which adjusts a position of the cylinder relative to the housing, and wherein the damping device further comprises a second adjustment device which adjusts a position of the piston rod relative to the cylinder.

30. The damping device according to claim 29, wherein the second adjustment device is formed by a screw by which a position of the piston rod relative to the cylinder can be adjusted.

31. The damping device according to claim 30, wherein the screw is disposed on a front face of the housing or a front face of the stop, and wherein the screw can be actuated from outside the housing.

32. The damping device according to claim 29, wherein the first adjustment device is formed by a worm gear.

* * * * *